(12) United States Patent
Lioy

(10) Patent No.: US 6,665,537 B1
(45) Date of Patent: Dec. 16, 2003

(54) AUTOMATIC INVOCATION OF MOBILE IP REGISTRATION IN A WIRELESS COMMUNICATION NETWORK

(75) Inventor: Marcello Lioy, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 0 days.

(21) Appl. No.: 09/235,118

(22) Filed: Jan. 21, 1999

(51) Int. Cl.[7] ................................................. H04Q 7/20
(52) U.S. Cl. ........................ 455/435; 455/432; 455/556
(58) Field of Search ................................ 455/556, 557, 455/435, 550, 410, 411, 466; 370/912, 913

(56) References Cited

U.S. PATENT DOCUMENTS

| | | | | |
|---|---|---|---|---|
| 5,590,133 A | * | 12/1996 | Billstrom et al. | 370/349 |
| 5,714,943 A | * | 2/1998 | Rasor | 340/825.44 |
| 5,896,369 A | * | 4/1999 | Warsta et al. | 370/338 |
| 5,901,352 A | * | 5/1999 | St-Pierre et al. | 455/435 |
| 5,958,018 A | * | 9/1999 | Eng et al. | 455/422 |
| 6,061,346 A | * | 5/2000 | Nordman | 455/422 |
| 6,137,791 A | * | 10/2000 | Frid et al. | 370/352 |
| 6,163,532 A | * | 12/2000 | Taguchi et al. | 455/554 |
| 6,230,012 B1 | * | 5/2001 | Willkie et al. | 455/435 |
| 6,256,300 B1 | * | 7/2001 | Ahmed et al. | 455/436 |
| 6,317,421 B1 | * | 11/2001 | Wilhelmsson et al. | 455/445 |

OTHER PUBLICATIONS

G. McGregor, The PPP Internet Protocol Control Protocol (IPCP); PPP IPCP, pp. 1–12, May 1992.
Perkins, C., Mobile Networking Through Mobile IP; IEEE Internet Computing, pp. 58–69, Jan.–Feb. 1998.
Perkins, C., IP Mobility Support; Network Working Group, pp. 1–51, Oct. 1996.
Seneviratne, A., et al., Cellular network and mobile internet; Computer Communications 21:1244–1255 (1998).

* cited by examiner

Primary Examiner—Nay Maung
Assistant Examiner—Tilahun Gesesse
(74) Attorney, Agent, or Firm—Philip R. Wadsworth; Charles D. Brown; Kevin T. Cheatham (57) ABSTRACT

A system and method for invoking the performance of mobile node registration in a wireless communication network. The system comprises a terminal device for transmitting and receiving packetized data and a communication device coupled to the terminal device. The communication device monitors the packetized data for an Internet Protocol (IP) address contained in an IP address request. If the IP address request is for a static IP address the communication device waits for network movement information. Based on the received network movement information, the communication device solicits network address information. Upon receipt of the network address information, the terminal device then initiates Mobile Node registration. As a result, the Mobile Node registration is automatically invoked whenever the terminal device changes its network point-of-attachment.

9 Claims, 4 Drawing Sheets

MT2 DEVICE STATE DIAGRAM

AUTOMATIC INVOCATION OF MOBILE IP REGISTRATION IN A WIRELESS COMMUNICATION NETWORK

BACKGROUND OF THE INVENTION

I. Field of the Invention

This invention generally relates to the field of wireless communications. More particularly, the present invention relates to a novel and improved method and system for automatically invoking a mobile terminal device to initiate IP mobility support in a wireless communications network.

II. Description of Related Art

Recent innovations in wireless communication and computer-related technologies, as well as the unprecedented growth of Internet subscribers, have paved the way for mobile computing. In fact, the popularity of mobile computing has placed greater demands on the current Internet infrastructure to provide mobile users with more support. The life blood of this infrastructure is the packet-oriented Internet Protocol (IP) which provides various services, including the addressing and routing of packets (datagrams) between local area networks (LANs). IP protocol is defined in Request For Comment 791 (RFC 791) entitled, "INTERNET PROTOCOL DARPA INTERNET PROGRAM PROTOCOL SPECIFICATION," dated September 1981, and herein incorporated by reference.

Heuristically, according to the IP protocol, data is encapsulated into IP packets for transmission. Addressing and routing information is affixed to the header of the packet. IP headers contain 32-bit addresses that identify the sending and receiving hosts. These addresses are used by intermediate routers to select a path through the network for the packet towards its ultimate destination at the intended address. A basic concept of IP addressing is that initial prefixes of the IP address can be used for generalized routing decisions. These prefixes contain implied geographical information about the location of a particular host on the Internet. In other words, whenever any router on the Internet receives a packet having a destination IP address that begins "129.46", the router forwards that packet in a particular direction towards the QUALCOMM, Inc. network in San Diego, Calif., USA. Thus, the IP protocol allows packets originating at any Internet node in the world to be routed to any other Internet node in the world, given that the originating party knows the IP address of the destination party.

Ideally, mobile computing should provide users with seamless and transparent Internet access regardless of time and its current point-of-attachment. The access should be seamless in the sense that, as the mobile user roams or migrates between networks, there is continuous Internet connectivity with no inconvenience or noticeable difference to the mobile user. The access should be transparent to the user such that applications do not need to be recompiled, reconfigured, or re-executed as the mobile user roams across various networks. Conventional internetworking protocols (e.g., TCP/IP, IPX, Appletalk™, etc.) are, at best, awkward in handling mobile users who migrate between networks. This is because, as stated above, the IP addressing scheme used for Internet routing inherently contains geographic information. If a mobile user desires to use a fixed IP address to identify his mobile terminal, the IP packets intended for the user will not be routed to the mobile terminal when the terminal happens to be away from the network corresponding to the fixed IP address (i.e., its "home" network). If the terminal attempts to rectify this by changing its address, it will lose all connectivity.

By way of example, suppose a user decides to remove his mobile terminal from its "home" network at QUALCOMM, Inc. in San Diego, and connect to Stanford University's network in Palo Alto, Calif. while maintaining his QUALCOMM-assigned fixed IP address. Conventionally, any IP packet intended for the mobile terminal will still be routed to QUALCOMM's network in San Diego because of the geographical-location information implicit in the mobile terminal's fixed IP address. Such IP packets will not be delivered to the mobile terminal while away from its "home" network unless some mechanism is in place to forward or route IP packets from QUALCOMM's network to the mobile terminal's current point-of-attachment at Stanford University's network in Palo Alto.

In order to meet the need for seamless and transparent Internet access, Request For Comment 2002 (RFC 2002), entitled "IP MOBILITY SUPPORT," dated October 1996 and herein incorporated by reference, specifies protocol techniques to achieve the transparent forwarding of IP packets to mobile terminals regardless of their particular point-of-attachment. Using these Mobile IP techniques, each mobile terminal is always identified by its "home" network IP address, regardless of its current point-of-attachment to the Internet. When the mobile terminal is located within its home IP network, it operates without the use of Mobile IP techniques. However, upon the mobile terminal detecting that it is no longer operating within its home IP network but is visiting a "foreign IP network", it obtains a foreign network "care-of" address which provides forwarding information necessary to route IP packets to its current point-of-attachment. This care-of-address may be proffered by an agent on the foreign network, "Foreign Agent" (e.g., a router in the foreign network) through its Agent Advertisement message. Mobile IP techniques require that the mobile terminal send a Registration-Request message to a "Mobility Agent" in order to register a desired care-of-address. This Mobility Agent may either be a "Home Agent" (i.e., a router in the terminal's home network) or the "Foreign Agent" and is responsible for returning a Registration-Reply granting or denying the Registration-Request. If granted, the Home Agent forwards the IP packets intended for the mobile terminal by using a technique called "IP tunneling." IP tunneling involves the Home Agent attaching a new IP header which contains the care-of-address to any arriving IP packet which has a destination address corresponding to the mobile terminal's home IP address. After arriving at the care-of-address, the Foreign Agent at the care-of-address strips off the IP tunneling header, and delivers the IP packet to the mobile terminal at its current point-of-attachment to the Internet.

In this way, Mobile IP supports mobile terminals that roam across different foreign networks and vary their network point-of-attachment, without having to change the mobile terminal's IP address. This capability has several advantages. First, it allows other nodes elsewhere on the Internet to send periodic "push" services (e.g., stock quotes, e-mail, etc.) to the mobile terminal regardless of the mobile terminal's location. This obviates the need for the mobile user to actively retrieve information from his home network. Second, Mobile IP allows the mobile terminal to relocate to different sub-networks, as often as desired, without any originating parties having to keep track of what sub-network the mobile terminal is currently attached to. Third, by design, Mobile IP is compatible with a variety of networks and media, ensuring seamless and transparent Internet access. For example, Mobile IP is capable of supporting packet traffic generated by a mobile terminal as it travels from its home Ethernet network segment to a foreign wireless LAN, without any significant interruption in service.

As stated above, the current trend is for mobile users to use mobile computers, such as laptop or palmtop computers, in conjunction with wireless communication devices, such as cellular or portable phones, to access the Internet. To wit, just as users conventionally employ "wired" communication devices to connect their computers to land-based networks, mobile users will use wireless communication devices, commonly referred to as "mobile stations" (MSs), to connect their mobile terminals to such networks. As used herein, mobile station or MS will refer to any subscriber station in the public wireless radio network that is intended to be used while in transit or during halts at unspecified points. MS devices include portable units (e.g., hand-held personal phones) and units permanently installed in vehicles (e.g., installed mobile phone units), as well as wireless local loop (WLL) telephones.

Figure 1:
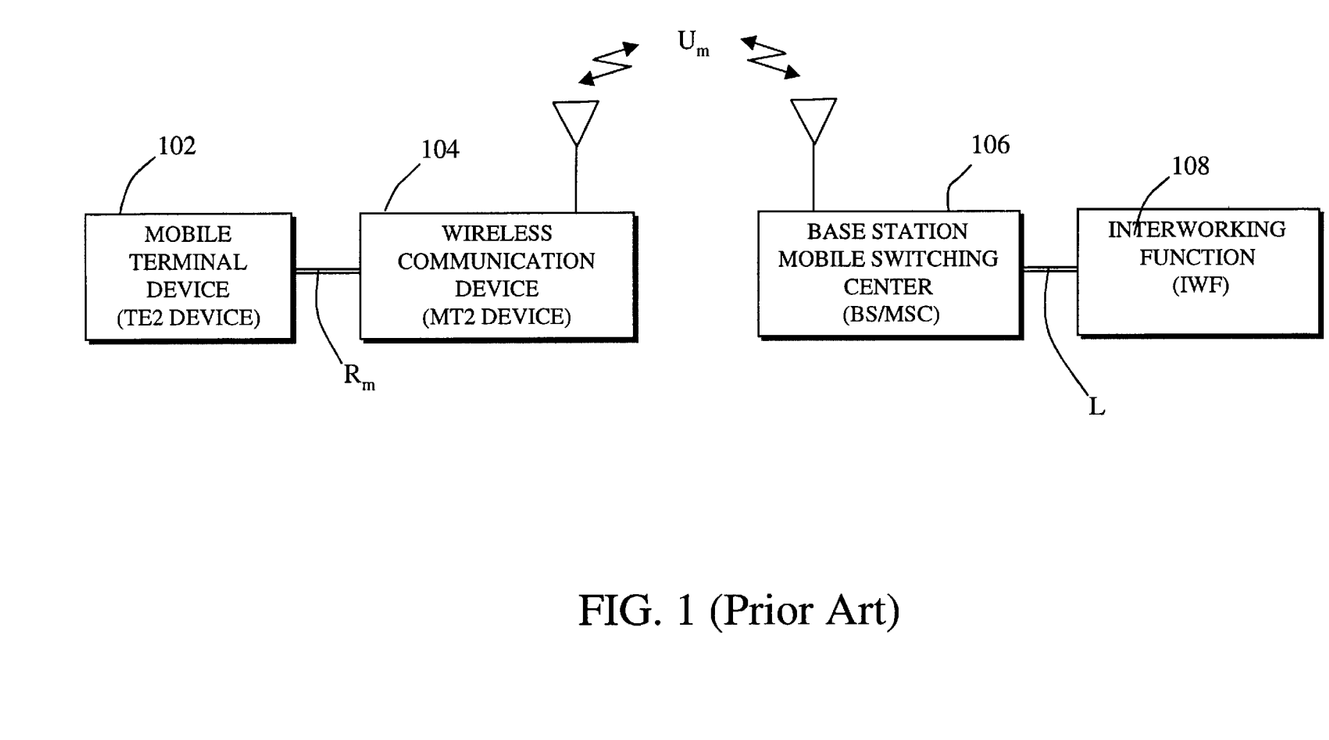
FIG. 1 (Prior Art) is a high level block diagram of a wireless communication system in which a terminal device connects to the Internet via a wireless communication device.

FIG. 1 (Prior Art) illustrates a high-level block diagram of a wireless data communication system in which mobile terminal equipment, TE2 device 102 (e.g., the mobile terminal, laptop, or palmtop computer), communicates with an Interworking Function (IWF) 108 via a wireless communication system. The wireless communication system includes a wireless communication device, MT2 device 104, and a Base Station/Mobile Switching Center (BS/MSC) 106. In FIG. 1, the IWF 108 serves as the access point to the Internet. IWF 108 is coupled to, and often co-located with, BS/MSC 106, which may be a conventional wireless base station as is known in the art. The TE2 device 102 is electronically coupled to the MT2 device 104, which in turn, communicates "wirelessly" with BS/MSC 106 and IWF 108. The TE2 device 102 and the MT2 device 104 may be integrated into a single unit or may be separated out as in an installed mobile phone unit in which a laptop is the TE2 device 102 and the transceiver is the MT2 device 104. The combination of the TE2 device 102 and the MT2 device 104, whether integrated or separate, is also referred to as a mobile node.

There are other protocols that address the data communication between the TE2 device 102 and the IWF 108. For example, Telecommunications Industry Association (TIA)/ Electronics Industries Association (EIA) Interim Standard IS-95, entitled "MOBILE STATION-BASE STATION COMPATIBILITY STANDARD FOR DUAL-MODE WIDEBAND SPREAD SPECTRUM CELLULAR SYSTEM" (published in July 1993), herein incorporated by reference, generally provides a standard for wideband spread spectrum wireless communication systems. Also, standard TIA/EIA IS-707.5, entitled "DATA SERVICE OPTIONS FOR WIDEBAND SPREAD SPECTRUM SYSTEMS: PACKET DATA SERVICES" (published February 1998), herein incorporated by reference, defines requirements for support of packet data transmission capability on TIA/EIA IS-95 wideband spread spectrum systems, of which BS/MSC 106 and IWF 108 may be a part. IS-707.5 specifies a packet data bearer service that may be used for communication between TE2 device 102 and IWF 108 via BS/MSC 106. It provides procedures that can apply to multiple packet data services, including the Mobile IP service of RFC 2002.

IS-707.5 also introduces two protocol option models which provide the requirements for communication protocols on the links between TE2 device 102 and the MT2 device 104 (the Rm interface), between the MT2 device 104 and the BS/MSC 106 (the Um interface), and between the BS/MSC 106 and the IWF 108 (the L interface). The first protocol option model, the Relay Model, represents the situation where the PPP link exists between the TE2 device 102 and the IWF 108. In this situation, the MT2 device 104 simply behaves as a pipe transmitting the TE2 device 102 PPP frames over the $U_M$ interface and the IWF 108 frames over the $R_M$ interface. In contrast, the second protocol option model, the Network model, represents the situation where two independent PPP links exist between the TE2 device 102 and the MT2 device 104 as well as between the MT2 device 104 and the IWF 108. In this case the MT2 device 104 is responsible for un-framing any received PPP packets and re-framing them before forwarding them to their final destination. In this case, it is possible that the MT2 device 104 is responsible for various aspects of mobility management and network address management.

Figure 2:
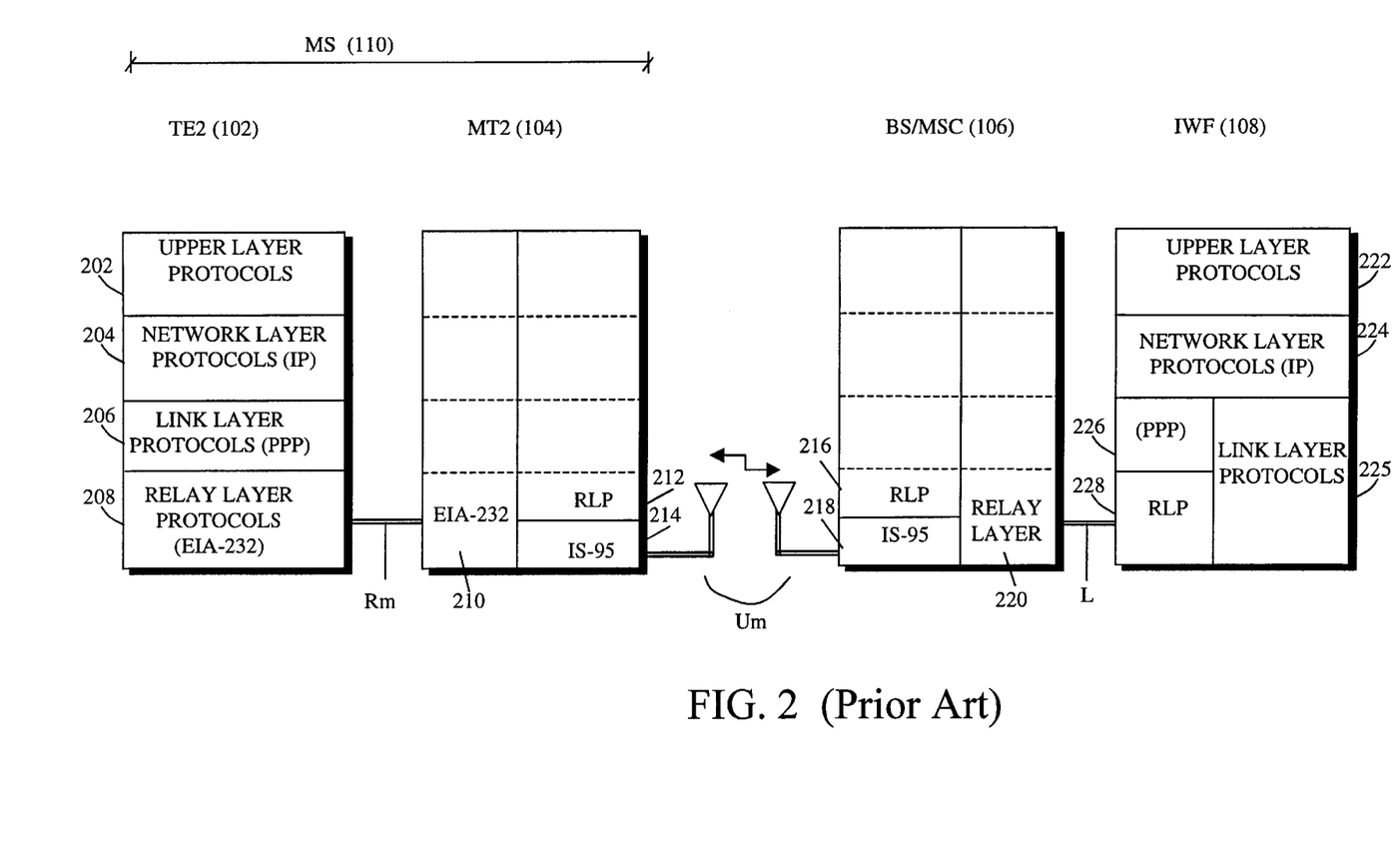
FIG. 2 (Prior Art) schematically describes the protocol stacks in each entity of the TIA/EIA IS-707.5 Relay Model.

FIG. 2 (Prior Art) is a diagram of the protocol stacks in each entity of the IS-707.5 Relay Model. FIG. 2 corresponds roughly to FIG. 1.4.2.1-1 of IS-707.5. At the far left of the figure is a protocol stack, shown in conventional vertical format, showing the protocol layers running on the TE2 device 102. The TE2 protocol stack is illustrated as being logically connected to the MT2 device 104 protocol stack over the Rm interface. The MT2 device 104, is illustrated as being logically connected to the BS/MSC 106 protocol stack over the Um interface. The BS/MSC 106 protocol stack is, in turn, illustrated as being logically connected to the IWF 108 protocol stack over the L interface.

The operation depicted by FIG. 2 is as follows: an upper layer protocol 202 entity, such as an application program running on the TE2 device 102, has a need to send IP packets over the Internet. A representative application may be a web browser program (e.g., Netscape Navigator™, Microsoft Internet Explorer™ etc.). The web browser requests a Universal Resource Locator (URL), such as HYPERLINK "http://www.Oualcomm.com/". A Domain Name System (DNS) protocol, also in the upper layer protocols 202, translates the textual host name www.Oualcomm.com to a 32-bit numeric IP address. The Hypertext Transfer Protocol (HTTP), also an upper layer protocol 202, constructs a GET message for the requested URL, and also specifies that Transmission Control Protocol (TCP) will be used to send the message and that TCP is used for HTTP operations.

The TCP protocol, also an upper layer protocol 202, opens a connection to the IP address specified by DNS and transmits the HTTP GET message. The TCP protocol specifies that the IP protocol will be used for message transport. The IP protocol, a network layer protocol 204, transmits the TCP packets to the IP address specified. The Point to Point Protocol (PPP), a link layer protocol 206, encodes the IP/TCP/HTTP packets and transmits them across the Rm interface using the relay layer protocol 208 EIA-232 to the EIA-232-compatible port on the MT2 device 104. The PPP protocol is described in detail in Request for Comments 1661 (RFC 1661), entitled "THE POINT-TO-POINT PROTOCOL (PPP)", herein incorporated by reference and briefly discussed below.

The EIA-232 protocol 210 on the MT2 device 104, passes the transmitted PPP packet to the Radio Link Protocol (RLP) 212 and then to the IS-95 protocol 214 for transmission to the BS/MSC 106 over the Um interface. The RLP protocol 212 is defined in IS-707.2, and the IS-95 protocol is defined in IS-95 mentioned above. A complementary relay layer protocol stack on the BS/MSC 106, including the RLP layer 216 and the IS-95 layer 218, receives the PPP packets over the Um interface and passes them to the MT2 relay layer protocol 220 for the L interface to the IWF relay layer protocol 228. The MT2 relay layer protocol 212 and the IWF relay layer protocol 228 are described in TIA/EIA IS-658 entitled, "DATA SERVICES INTERWORKING FUNCTION INTERFACE STANDARD FOR WIDEBAND SPREAD SPECTRUM DIGITAL CELLULAR SYSTEM", herein incorporated by reference.

The PPP protocol 226 in the link layer of the IWF decodes the PPP packets from the TE2 device 102, and serves to terminate the PPP connection between the TE2 device 102 and the IWF 108. The decoded packets are passed from the PPP protocol 226 to the IP protocol in the network layer protocols 224 of the IWF 108 for examination, and further routing to the IP address specified by the TE2 device 102 in the IP packet header (i.e., in this case, the IP address for www.Qualcomm.com). If there are any upper layer protocol tasks to be performed at the IWF 108, such as TCP, they are performed by the upper layer protocols 222.

Assuming that the ultimate destination of the IP packets generated by the TE2 device 102 is not the IWF 108, the packets are forwarded through the network layer protocols 224, the link layer protocols 227 of the IWF 108 to the next router (not shown) on the Internet. In this manner, IP packets from the TE2 device 102 are communicated through the MT2 device 104, the BS/MSC 106, and the IWF 108 towards their ultimate intended destination on the Internet, thereby providing wireless packet data services for the TE2 device 102 according to the IS-707.5 standard relay model.

Before the TE2 device 102 packets reach their destination, however, it is imperative that the data link connection is established first. As specified in RFC 1661, this requires each end of the point-to-point link (i.e., the TE2 PPP protocol 206 and IWF PPP protocol 226) to first send PPP Link Control Protocol (LCP) packets in order to establish, configure and test the data link connection. After the link has been established by the LCP, the PPP protocol 206 then sends Network Control Protocol (NCP) packets to configure the network layer protocols (i.e., the TE2 IP protocol 204 and IWF IP protocol 224). After each of the network layer protocols has been configured, packets from each network layer protocol can be sent over the link between them.

The NCP for IP in PPP links is the IP Control Protocol (IPCP). IPCP is described in detail in Request for Comment 1332 (RFC 1332), entitled "THE PPP INTERNET PROTOCOL CONTROL PROTOCOL (IPCP)" published May 1992, and herein incorporated by reference. IPCP is responsible for configuring, enabling, and disabling both the TE2 IP protocol 204 and the IWF IP protocol 224 that run at either end of the point-to-point link.

IPCP employs configuration request messages that include IP address configuration options. The configuration option portion provides a mechanism to negotiate the IP address to be used by the sender of the Configure-Request (i.e., here, the TE2 device 102). Specifically, the IP address configuration option allows the Configure-Request sender to state the desired IP address either by proffering an IP address or by requesting that the peer (i.e., in this case, the IWF 108) provide a dynamic IP address for the sender. If the Configure-Request sender sets the IP address field of the IP address configuration option to all zeros, the peer will provide a dynamic IP address by sending a Configure-NAK for the option and returning a valid IP address. If, on the other hand, the Configure-Request sender specifies an address in the IP address field, the peer can indicate that the specified IP address is acceptable by sending a Configure-ACK for the option.

Figure 3:
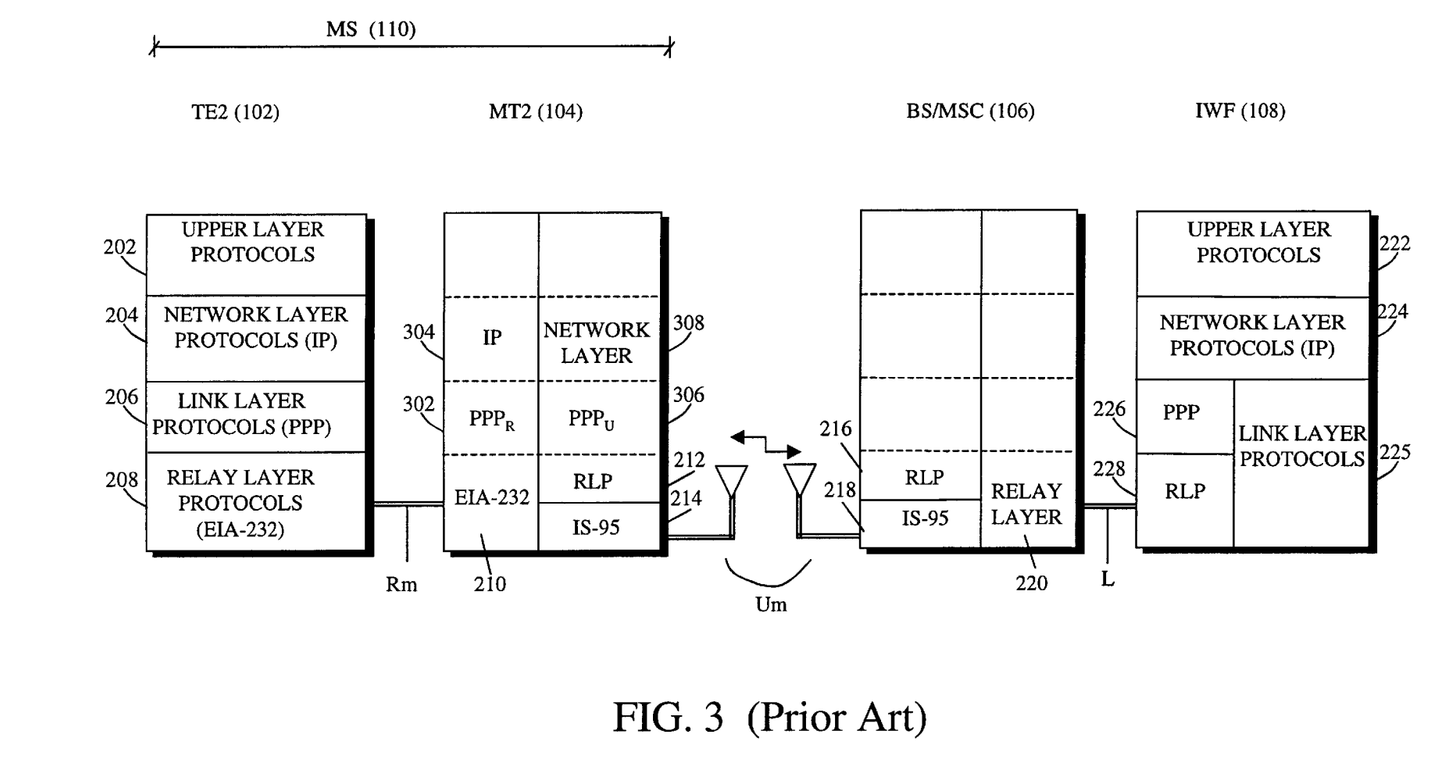
FIG. 3 (Prior art) is a diagram of the protocol stacks in each entity of the IS-707.5 network Model.

Alternatively, FIG. 3 (Prior Art) is a diagram of the protocol stacks in each entity of the IS-707.5 Network Model which corresponds roughly to FIG. 1.4.2.2-1 of the standard. To the extent that the protocol flow and mechanisms of the TE2 device 102, BS/MSC 106, and IWF 108 are similar to those included in the Relay Model, as depicted in FIG. 2, the reference numerals remain the same. Because the Network model reflects situations where the MT2 device 104 may be responsible for packet mobility management and network address management, the MT2 device 104 contains additional protocol levels. For example, after receiving the PPP packets from the TE2 device 102 via the EIA-232 protocol 210, and the packets are passed on to the $PPP_U$ layer 302, where they are unframed. The packets are subsequently forwarded up to the IP layer 304. For packets that are destined to the IWF 108, the packets are passed back down to the $PPP_R$ layer 306 where they are re-framed. Much like the packets in the Relay Model at this stage, the packets are then sent to the Radio Link Protocol (RLP) 212 and then to the IS-95 protocol 214 for transmission to the BS/MSC 106 over the Um interface.

As presented above, the IS-95 standard provides the general specification for wideband spread spectrum wireless communications. The IS-707.5 standard provides the requirements for communication protocols on the links between a TE2 device 102 and an IWF 108, including the requirements for the Rm, the Um, and the L interfaces. Moreover, shown above, RFC 1661 defines the standard for establishing, configuring and testing the point-to-point data link and RFC 1331 sets forth the PPP-IPCP standard establishing and configuring the IP for both, the TE2 102 side and IWF 108 side of the point-to-point link. As such, the standards and protocols proffered by IS-95, IS-707.5, RFC 1661, and RFC 1331 carefully dovetail and amply support the functionality of Mobile IP services as defined in RFC 2002.

With this said, it is important to note that none of these standards or protocols, not even Mobile IP RFC 2002, provide a mechanism for ensuring that the mobile terminal or TE2 device 102 takes appropriate action when it has moved its network point-of-attachment. Specifically, when a mobile terminal, such as a laptop, initially attempts to attach to a network other than its home network (i.e., foreign network), RFC 2002 provides a way for the laptop to invoke the Mobile IP node registration procedure to ensure that data destined to the laptop's home network is routed back to the foreign network point-of-attachment. However, if the laptop roams beyond the metes and bounds of its initial foreign network point-of-attachment, there is nothing guarantee that the laptop will be notified that it has moved. In fact, the only device aware that the laptop has roamed to a new point-of-attachment is the MT2 device 104 where the MT2 device 104 becomes aware of this network movement information through signaling traffic from the IS-95 network. Such network information is well-known in the art and is defined in aforementioned TIA/EIA IS-95 standard. Although IS-95 shall not be discussed in detail, some examples of network movement information-bearing signaling includes voice-zone registration, packet-zone identification, system ID changes, network ID changes, PPP packet resynchronization, etc.

What is needed is a method and system that utilizes the mobile station or wireless communication device (i.e., MT2 device 104) for automatically triggering the mobile terminal device (i.e., TE2 device) to re-initiate the Mobile IP registration procedure and update the terminal and Home Agent with the relevant foreign network point-of-attachment information.

SUMMARY OF THE INVENTION

The present invention addresses the need identified above by providing a system and method that allows a wireless communication device to automatically invoke a terminal device to perform Mobile IP node registration when the terminal device has traveled outside the scope of its current network.

Systems and methods, consistent with the principles of the present invention as embodied and broadly described herein, includes a terminal device for transmitting and receiving packetized data and a communication device coupled to the terminal device. The communication device monitors the packetized data for an Internet Protocol (IP) address contained in an IP address request. If the IP address request is for a static IP address the communication device waits for network movement information. Based on the received network movement information, the communication device solicits network address information. Upon receipt of the network address information, the terminal device then initiates Mobile Node registration. As a result, the Mobile Node registration is automatically invoked whenever the terminal device changes its network point-of-attachment.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION OF THE PREFERRED EMBODIMENTS

The following detailed description of the present invention refers to the accompanying drawings that illustrate preferred embodiments consistent with this invention. Other embodiments are possible and modifications may be made to the embodiments without departing from the spirit and scope of the invention. Therefore, the following detailed description is not meant to limit the invention. Rather the scope of the invention is defined by the appended claims.

The Mobile IP protocol allows a mobile node (e.g., a computer host or router) to change its IP point-of-attachment from one network to another. The IP node, being mobile, is capable of changing its location without changing its (permanent) IP home address. The present invention takes advantage of the Mobile IP protocol, as well as other protocols and standards which govern the communications between the TE2 device 102, the MT2 104, and the IWF 108, to automatically determine whether and when the TE2 102 re-initiates Mobile Node registration in order to maintain the link-layer connectivity. In this manner, the mobile IP node can continue communicating with other IP nodes at any location.

The present invention is intended to support seamless and transparent mobility to users of data services-enabled devices. Therefore, a preferred embodiment of the present invention includes TE2 and MT2 devices 102, 104 that contain Mobile IP support capabilities.

It will be apparent to one of ordinary skill in the art that the present invention as described below may be implemented in many different embodiments of software, firmware, and hardware in each of the entities illustrated in the figures (i.e., TE2 device 102, MT2 device 104, BS/MSC 106 and IWF 108). For example, the TE2 device 102 may be a laptop computer with a processing unit executing Mobile IP-compliant software instructions. Similarly, the MT2 device 104 may contain a processing unit that processes TE2 device 102 information and communications network information. The actual software code or control hardware used to implement the present invention is not limiting of the present invention. Thus, the operation and behavior of the present invention will be described without specific reference to the actual software code or hardware components, it being understood that a person of ordinary skill in the art would be able to design software and control hardware to implement the preferred embodiment of the present invention based on the description herein.

Figure 4:
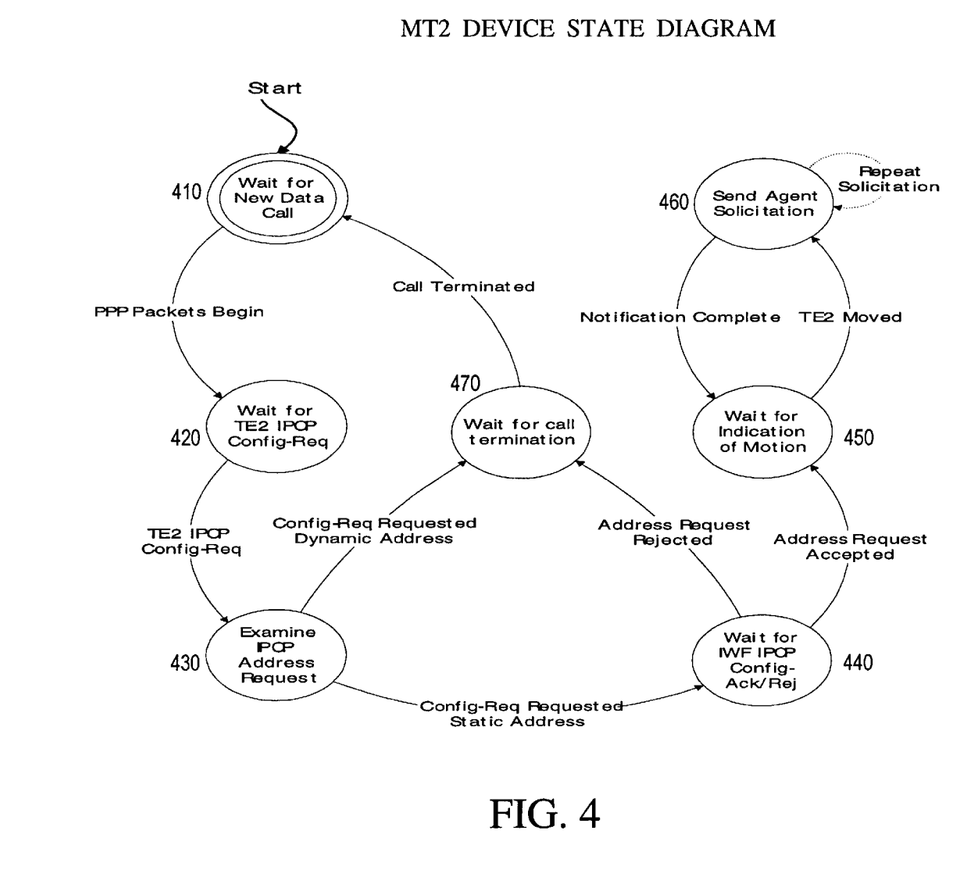
FIG. 4 is a high-level state diagram of the operation of the MT2 device of the present invention.

FIG. 4 is a high-level state diagram of the operation of the MT2 device 104 of the present invention. The MT2 device 104 begins in the "WAIT FOR NEW DATA CALL" state 310. In state 410, the MT2 device 104 is not currently in a call, but is waiting for the TE2 device 102 to originate a call. Mobile-terminated calls (i.e., those where the MT2 device 104 is the called party) are not considered in this state, as they assume that the MT2 device 104 has either already been assigned an IP address, or has already registered for Mobile IP.

When the TE2 device 102 sends PPP packets to the MT2 device 104, as per RFC 1661, the MT2 104 device interprets it as an attempt to establish a packet data call and, therefore, initiates a data call. This data call transitions the MT2 104 device into the "WAIT FOR TE2 IPCP CONFIG-REQ" state 420.

In state 420, the MT2 device 104 simply waits for the TE2 device 102 to begin the IP address negotiation process, as prescribed in RFC 1332. Upon the TE2 device 102 sending an IP address Config-Req message, the MT2 device 104 transitions into the "EXAMINE IPCP ADDRESS REQUEST" state 430.

If the address requested by the TE2 device 102 is a dynamic address (i.e., IP address are all zeros), then there is no request for Mobile IP support by the TE2 device 102, and the MT2 device 104 transitions to the "WAIT FOR CALL TERMINATION" state 470. In this state, the MT2 device 104 essentially ignores everything until the call is terminated. Once the call is terminated, the MT2 device 104 transitions back to state 410 and waits for a new data call.

If the IP address field in the Config-Request sent by the TE2 device 102 contains a specific or static (i.e., non-zero) IP address, the MT2 device 104 then transitions to the "WAIT FOR IWF IPCP CONFIG-ACK/REJ" state 440.

In state 440, the MT2 device 104 examines the IPCP packets to determine what the response is to the Config-Request i.e., whether the static IP address request made by the TE2 device 102 has been accepted by the IWF 108 with a configure ACK. If the static IP address request made by the TE2 device 102 is denied by the IWF 108, then the MT2 device 104 transitions back to state 470 because the call cannot be a Mobile IP call since the TE2 device is not given the address requested. As such, the MT2 device 104 simply ignores all transactions and waits for the call to be terminated. If the static IP address request made by the TE2 device 102 is accepted by the IWF 108, then the MT2 device 104 confirms that this is a Mobile IP data call and transitions to the "WAIT FOR INDICATION OF MOTION" state 450.

In state 450, the MT2 device 104 waits for indications by the network that the TE2 device 104 has moved from its prior network point-of-attachment. As stated above, this network movement information is extracted through the signaling traffic from the IS-95 network. Once the MT2 device 104 receives indications by the network that the TE2 device 102 has moved i.e., has changed networks, the MT2 device 104 transitions into the "SEND AGENT SOLICITATION" state 460.

In state 460, the MT2 device 104 sends a Solicitation Message to available Foreign Agents to exploit the default Agent Advertisement mechanism, as outlined in Mobile IP RFC 2002. As indicated by the feedback transition arrow of state 460, the sending of this Solicitation Message may be repeated several times to guard against its inadvertent loss and ensure its receipt by the Foreign Agent.

By having the MT2 device 104 send a Solicitation Message, this invention takes advantage of the Mobile IP infrastructure as the Foreign Agent, upon receiving the message, is triggered into sending an Advertising Message with a foreign network care-of-address to the TE2 device 102 IP address. Pursuant to RFC 2002, the TE2 device 102 notices that the care-of-address has changed and that it must re-register its IP address. For example, if the TE2 device 102 determines that it has returned to its home network, the TE2 device will initiate the Mobile IP node de-registration procedure with its Foreign Agent. If, however, the TE2 device 102 detects a "new" foreign network, it will proceed by re-initiating the Mobile IP mobile node registration procedure and ultimately establishing a care-of-address on the new foreign network.

This invention, therefore, provides a system and method that utilizes the MT2 device 104 to automatically trigger the TE2 device 102 into re-initiating the Mobile IP Registration procedure when the TE2 device 102 has traveled outside its current network point-of-attachment.

The foregoing description of preferred embodiments of the present invention provides illustration and description, but is not intended to be exhaustive or to limit the invention to the precise form disclosed.

Modifications and variations are possible consistent with the above teachings or may be acquired from practice of the invention. The scope of the invention is defined by the claims and their equivalents.

What is claimed is:

1. A method for invoking mobile node registration in a wires communication network having a terminal device coupled to a mobile communication device for transmitting and receiving packetized data, said method comprising:

interfacing said mobile communication device with said wireless communication network;

receiving, by said mobile communications device, network movement information from the wireless communication network;

soliciting, by said mobile communications device, network IP address information from said wireless communication network;

receiving, by said mobile communication device, network IP address information from said wireless communication network; and     initiating, by said terminal device, mobile node registration in response to said network movement information received by said mobile communication device.

2. The method of claim 1, further including, monitoring, by said mobile communication device, said transmitted packetized data for an IP address contained in an IP address request, and     waiting, by said mobile communication device, for network movement information if said IP address request is for a static IP address.

3. A system for automatically invoking mobile node registration in a wireless communication network, said system comprising:

a mobile communication device for interfacing over a wireless link with said wireless communication network, said mobile communication device receiving network movement information from said wireless communication network;

a terminal device, having an IP address, coupled to said mobile communication device, for transmitting and receiving packetized data associated with the IP address, wherein said terminal device initiates mobile node retraction in response to said network movement information;

wherein said mobile communication device includes means for monitoring said packetized data transmitted by said terminal device for an IP address contained in the IP request; and wherein the IP address is a static IP address.

4. A system for automatically invoking mobile node registration in a wireless communication network, said system comprising:

a mobile communication device for interfacing over a wireless link with said wireless communication network, said mobile communication device receiving network movement information from said wireless communication network;

a terminal device, having an IP address, coupled to said mobile communication device, for transmitting and receiving packetized data associated with the IP address, wherein said terminal device initiates mobile node registration in response to said network movement information and wherein the IP address is a static IP address;

wherein said mobile communication device includes means for monitoring said packetized data transmitted by said terminal device for an IP address contained in the IP request; and wherein the mobile communication device includes means for soliciting the wireless communication network for network IP address information in response to the network movement information.

5. A system for automatically invoking mobile node registration in a wireless communication network, comprising:

a mobile communication device for interfacing over a wireless communication link with the wireless communication network, the mobile communication device receiving network movement information from the wireless communication network; and a terminal device, having a static IP address associated with a home agent, coupled to the mobile communication device;

wherein the terminal device, through the wireless communication link, transmits packetized data to, and receives packetized data from, an internetworking function using an Internet Protocol, and the terminal device initiates mobile node registration in response to the network movement information.

6. The system of claim 5, wherein the wireless communication network is a CDMA wireless network.

7. The system of claim 6, wherein the movement information is a change the wireless communication network system ID received by the mobile communication device.

8. The system of claim 6, wherein the movement information is a change in the wireless communication network ID received by the mobile communication device.

9. The system of claim 5, wherein the terminal device initiates mobile node registration by soliciting an agent advertisement message that identifies the home agent or one of a plurality of foreign agents.

* * * * *